Dec. 2, 1952 D. A. McMILLEN ET AL 2,619,726
SPHERICALLY CURVED PLOTTING BODY AND COMPASS FOR USE THEREWITH
Original Filed Aug. 4, 1942 4 Sheets-Sheet 1
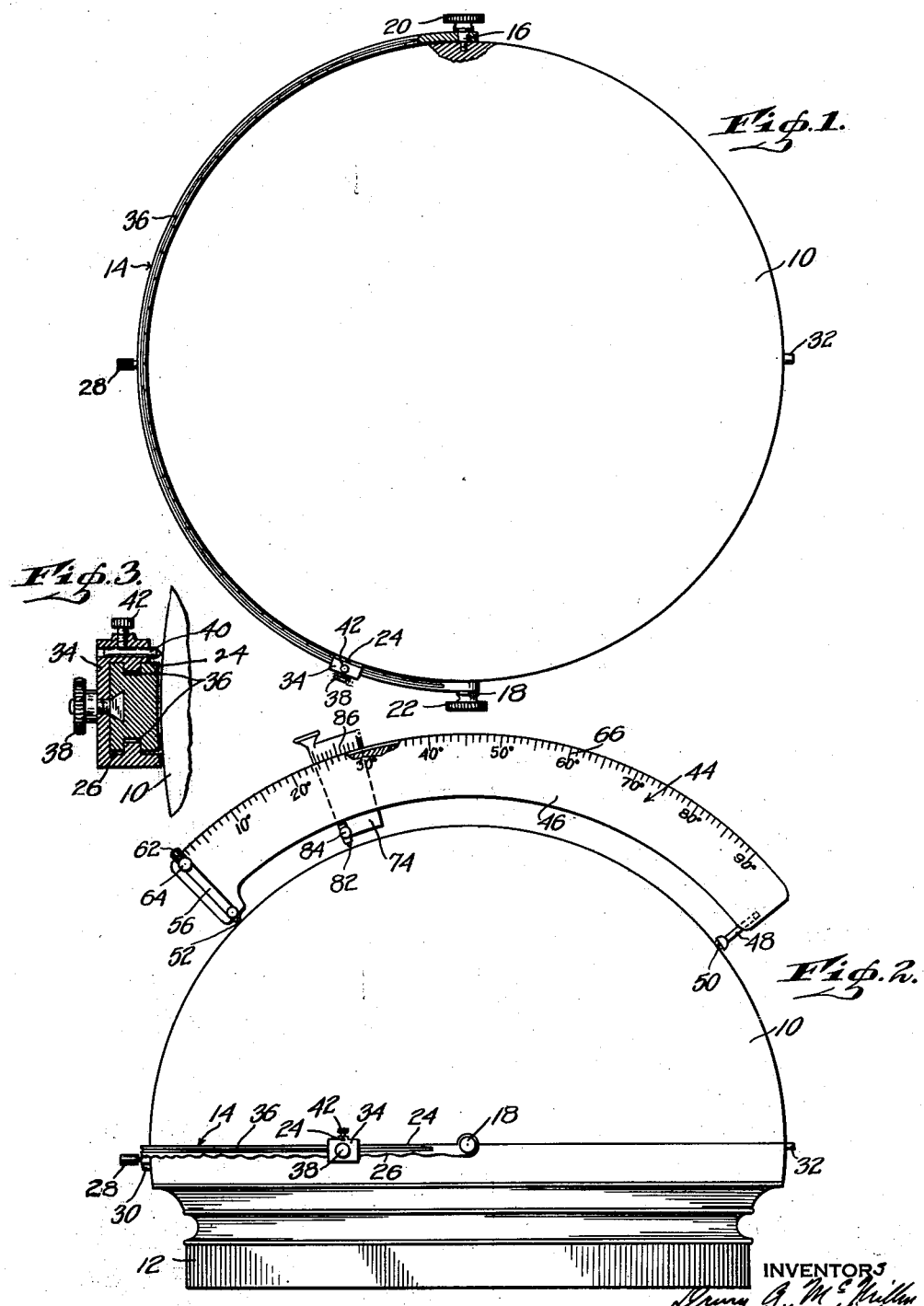
INVENTORS
BY
ATTORNEY Dec. 2, 1952  D. A. McMILLEN ET AL  2,619,726
SPHERICALLY CURVED PLOTTING BODY AND COMPASS FOR USE THEREWITH
Original Filed Aug. 4, 1942  4 Sheets-Sheet 2
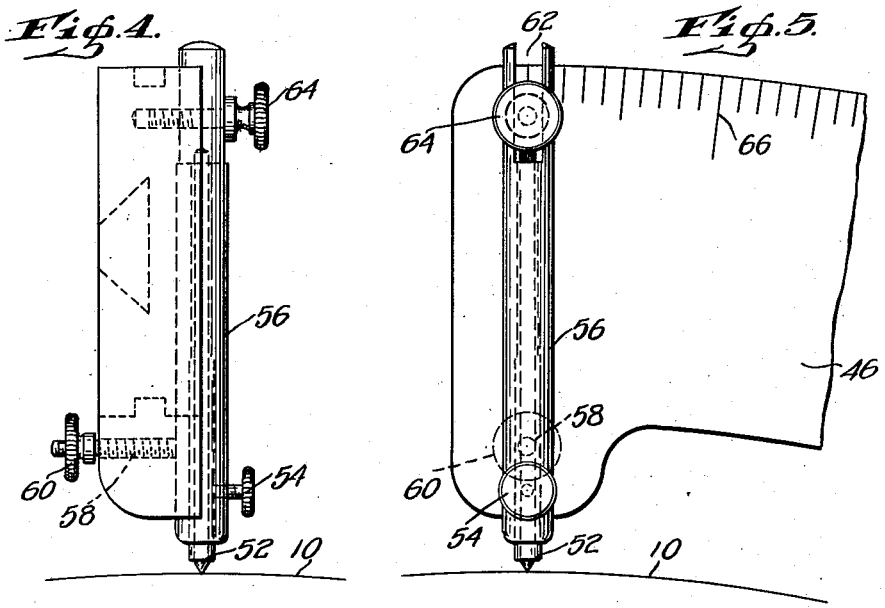
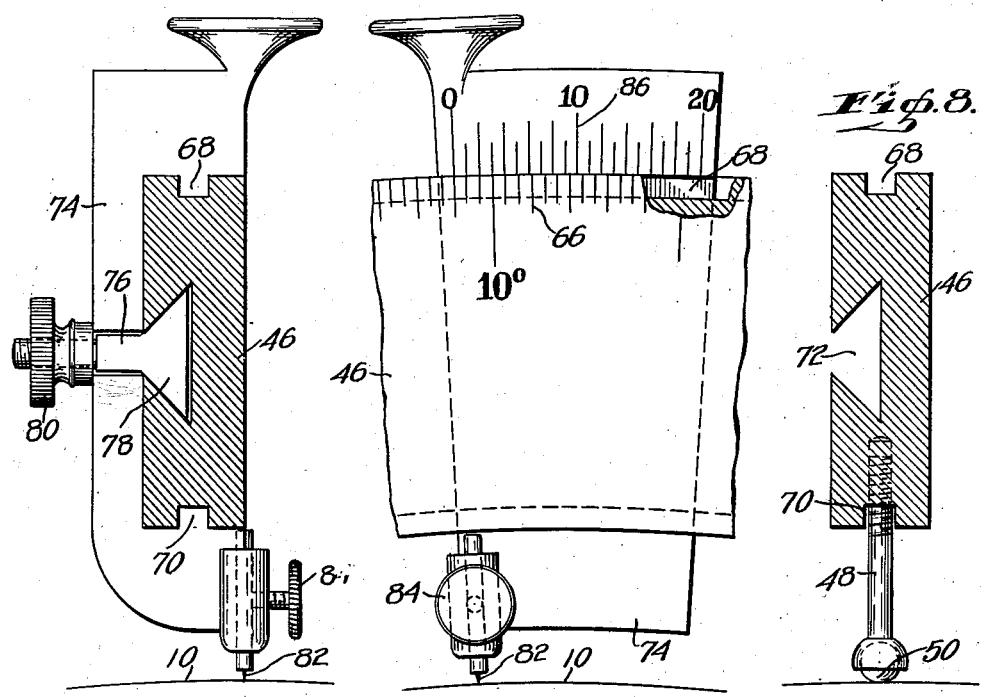
INVENTORS
BY
ATTORNEY Dec. 2, 1952      D. A. McMILLEN ET AL      2,619,726
SPHERICALLY CURVED PLOTTING BODY AND COMPASS FOR USE THEREWITH
Original Filed Aug. 4, 1942      4 Sheets-Sheet 3
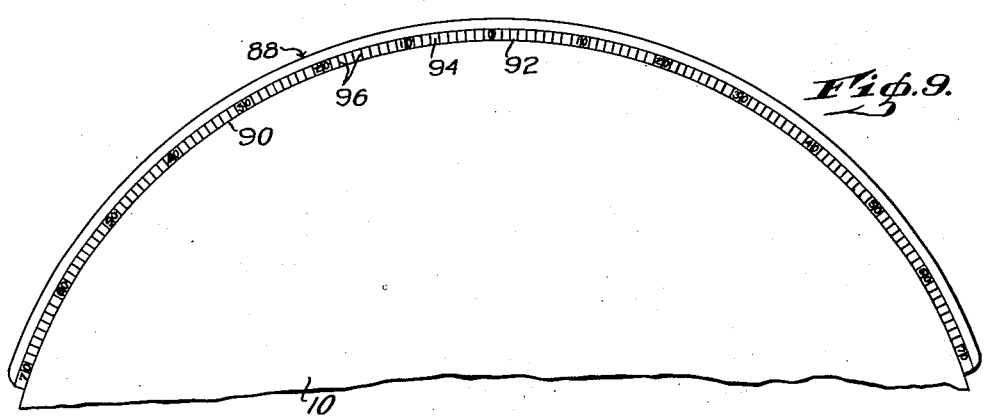
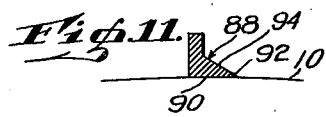
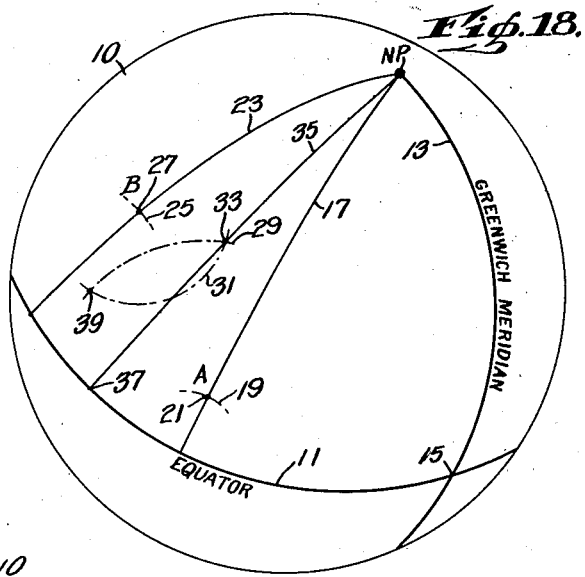
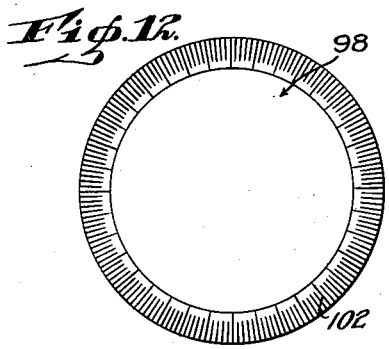
INVENTORS
BY
ATTORNEY

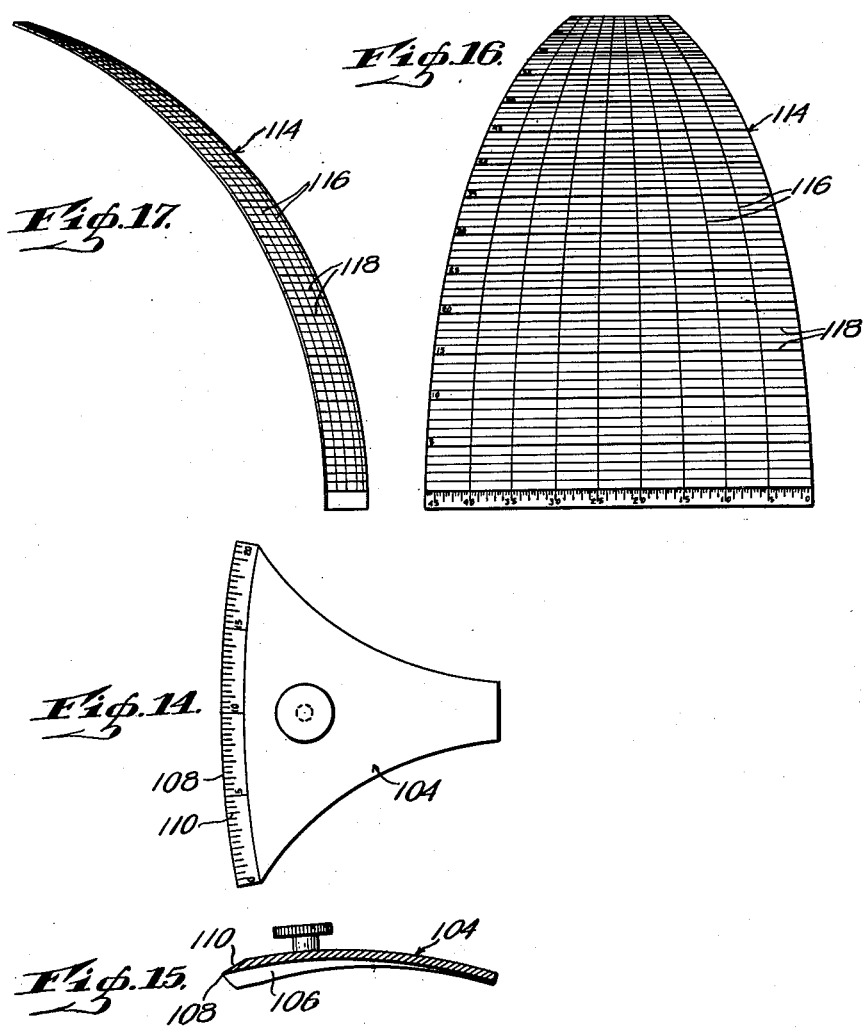

Patented Dec. 2, 1952

2,619,726

UNITED STATES PATENT OFFICE 2,619,726

SPHERICALLY CURVED PLOTTING BODY AND COMPASS FOR USE THEREWITH

Drury A. McMillen and Anton Stuxberg, Sao Paulo, Brazil

Original application August 4, 1942, Serial No. 453,608. Divided and this application May 12, 1945, Serial No. 593,458. In Canada June 9, 1942

4 Claims. (Cl. 33—21)

This application is a division of my copending application, now abandoned, Serial No. 453,608, filed August 4, 1942.

The present invention relates to celestial navigation, that is, the determination of position on the earth's surface by the aid of the observation of one or more celestial bodies.

Modern celestial navigation has been developed over a period of about two centuries, starting with the invention of the sextant, the marine chronometer and the printing of the first nautical almanac, but as until very recently developed has been directed toward the determination of position of relatively slow moving bodies such as ships. As thus developed, celestial navigation has involved complex and time consuming calculations requiring among other things the determination by dead reckoning of an assumed position as a starting point for calculations and the mathematical solution of the so-called spherical triangle. This procedure, while of practical utility in the hands of a skilled navigator for determining the position of a ship, is wholly inadequate, because of the time element involved, for determining the position of an aircraft, the speed of which, coupled with unknown wind drift and other variables affecting aircraft flight, would in many instances render impossible the determination by dead reckoning of an assumed position with sufficient accuracy to be usable and which would render the computed result of such observations useless.

Owing to the rapid development of aircraft capable of sustained flight over long distances and the fact that because of the altitude at which such craft can be flown, observation of celestial bodies is usually readily effected, much attention has in recent years been given to the problem of simplifying the earlier methods of celestial navigation in order to reduce the time element required to determine a position from a given set of observations. Proposals heretofore made have, however, been in the main directed toward attempts to speed up existing methods of charting courses by providing tables giving in very complete and minute detail the data covering the positions of the celestial bodies considered useful for the purposes of celestial navigation and tables of logarithms and other mathematical tables and charts. Such very complete data is extremely voluminous and while permitting certain short cuts to be taken does not eliminate the necessity for the utilization of a dead reckoned position as a starting point, the computation and transfer of data from a system of spherical coordinates to a distorted two dimensional chart and other factors which are not only time consuming but which introduce errors of inadmissible magnitude. Moreover, even with the most simplified of systems heretofore proposed, long and thorough mathematical and navigational training are required before they can be intelligently used without risk of serious error in result, particularly when it is essential that the result be obtained with the utmost speed.

It is therefore a general object of the present invention to provide novel means whereby positions on the earth's surface may be determined from celestial observations with sufficient rapidity, certainty and accuracy to render celestial navigation wholly practical as a method for determining the position of bodies travelling as rapidly as high speed aircraft. A further general object of the invention is the provision of novel celestial navigational means which are reduced to such simple and readily comprehensible nature as to be practically usable by one having only relatively rudimentary mathematical training and with little if any previous navigational training. A further general object of the invention is the provision of improved means of the above described kind which shall be usable either by night or by day as conditions may require.

The above general objects, and other and more detailed objects which will become apparent as this description proceeds, are obtained in accordance with our invention by a system based upon graphical solution of the problems of spherical trigonometry required to be solved in order to translate celestial observations into terms of the geographical position of the observer. Stated in another way our invention involves what may be termed spherographical methods which contemplate the direct transfer of celestial observational data to and the plotting thereof upon a spherically curved body representative of the surface of the earth or a portion thereof and having a predetermined known scale relationship to the earth's dimensions. For purposes of convenience such body will be referred to herein as a plotting body.

In order to determine positions from celestial observations by the aid of such a plotting body various different specific procedures may be followed, the nature of which will be dictated by the conditions under which the projected flight is to be made, and for a better understanding of the more detailed nature of our invention and the manner and advantages of its use, reference may best be had to the ensuing portion of this specification taken in conjunction with the accompanying drawings forming a part hereof and illustrative of the instruments to be employed and the manner of their utilization.

In the drawings:

Figs. 1 and 2 are top plan and elevation views, respectively, of one form of plotting body suitable for use in practicing the invention, Fig. 2 showing in addition an arcuate rule or a compass intended to be used in conjunction with the plotting body;

Fig. 3 is a view on enlarged scale of a part of the structure shown in Figs. 1 and 2;

Figs. 4 and 5 are end and fragmentary side views, respectively, on enlarged scale, of the arcuate rule shown in Fig. 2;

Fig. 6 is a fragmentary view on enlarged scale of another portion of the arcuate rule shown in Fig. 2, showing a vernier slide and scale therefor;

Fig. 7 is a section taken at right angles to Fig. 6;

Fig. 8 is a transverse section of still another portion of the arcuate rule shown in Fig. 2;

Fig. 9 is an elevation showing a great circle rule intended for use in conjunction with the plotting body of Figs. 1 and 2;

Fig. 10 is a top plan view of the rule shown in Fig. 9;

Fig. 11 is a transverse section of the rule shown in Fig. 9;

Fig. 12 is a top plan view of a protractor intended for use with the plotting body shown in Figs. 1 and 2;

Fig. 13 is a side elevation of the protractor shown in Fig. 12;

Fig. 14 is a top plan view of a measuring instrument intended for use with the plotting body of Figs. 1 and 2;

Fig. 15 is a side view of the instrument shown in Fig. 14;

Fig. 16 is an elevation of a shield usable with the plotting body shown in Figs. 1 and 2;

Fig. 17 is a side view of the shield shown in Fig. 16;

Fig. 18 is a diagram showing the use of a spherical plotting body for effecting one kind of navigation by the present invention.

Referring now more particularly to Figs. 1 through 17, we will first describe suitable examples of the instrumentalities required or conveniently usable in the practice of our invention, thereafter describing the methods of their use to secure the desired results.

In Figs. 1 and 2 there is shown at 10 a plotting body having a spherically curved surface the radius of which bears a predetermined scale relationship to the radius of the earth. For reasons hereinafter more fully appearing, we prefer to make this body with a surface having a radius of 171.88 millimeters, this radius corresponding to a scale of 3 millimeters to 1° of arc of a great circle on the surface of the earth. In the example shown, the plotting body provides slightly more than a hemisphere, mounted for convenience on a base 12, but in so far as the exercise of the present invention is concerned, the surface of the plotting body may constitute a lesser portion of a sphere or may constitute a complete sphere or globe.

Choice of the extent of the surface area provided by the plotting body will be determined largely by its intended use. If courses which are to be plotted thereon lie within one hemisphere of the globe the form of body illustrated herein may be most convenient. If intended for use in navigation involving courses lying in more extended areas the full globular form will ordinarily be most convenient.

Advantageously, but not necessarily, the surface of the plotting body 10 has permanently marked thereon an equator line 11 and a Greenwich meridian line 13, the equator line having associated therewith a scale indicating degrees of longitude.

A rigid arcuate member, which in the example shown is a half hoop and which in case of the use of a full globular plotting body may be in the form of a complete hoop, is pivotally mounted as at 16 and 18 to have relative pivotal movement with respect to the surface of the plotting body, the pivot points being coincident with a diameter of the body 10. For convenience this member may be termed a meridian rule. If the body 10 provides a complete globular surface, thus making a base of the type herein illustrated inconvenient to use, the globular body may be mounted on a pedestal of small diameter or carried from a suitable base by a yoke attached at the pivot points of the meridian rule, or the mounting may be attached to the meridian rule, leaving the globe free to revolve about the axis determined by the pivot points. The pivot mountings for the meridian rule are conveniently provided with thumb screws 20 and 22 usable to clamp the meridian rule and plotting body in any desired position relative to each other.

The form of the member 14 is such that one side 24 thereof will lie exactly in a diametral plane passing through the pivot points 16 and 18, this side being planar and further preferably having its inner edge curved to a radius only enough greater than the radius of the surface of the plotting body to provide necessary clearance. To aid in this, the radially inner surface of the member 14 may if desired be made concavely spherically curved to approximately the radius of body 10.

The side 24 of member 14 is preferably provided with a degree scale, showing degrees of arc numbered on each side away from a zero mark located midway between the pivot points.

The side 26 of the meridian rule, which obviously cannot lie on a diameter, is advantageously made of waved or other non-planar configuration to insure it not being mistakenly used by an operator for the side 24 which corresponds to a true meridian line. In the embodiment shown, the meridian rule is provided with a small manipulating handle 28 and the plotting body is conveniently provided with small diametrically opposed stops 30 and 32 to limit the arc of travel of the pivoted rule.

The member 14 is provided with a marking or scribing slide 34 arranged to engage and slide along suitable guide grooves 36 in the member 14 and being provided with a clamping bolt and screw 38, the head of the bolt sliding in a suitable undercut groove in the member 14. The slide 34 carries a marking element 40, which may be a pen, pencil or scribing point, suitably clamped in position by the clamping screw 42.

Referring now more particularly to Figs. 2 and 4 to 8, there is shown an arcuate rule indicated generally at 44 for use with the plotting body 10. This rule comprises a rigid arcuate body member 46 provided at one end with an adjustable stud 48, preferably provided at its lower end with a socket retaining a ball 50 providing a foot. At its opposite end member 46 carries an adjustably mounted marking element such as a pencil or scriber 52, the extent of the radial projection of which from the member 46 is governed by the clamping screw 54. The marking element is mounted in a carrier 56 having a pivot pin 58 passing through a suitable hole in the member 46 and secured in place by means of a thumb nut 60. At its outer end the carrier 56 is slotted as at 62 to provide a forked end through which a thumb screw 64 extends into the member 46. Clearance is provided between the several parts so that the point of the marking element may be adjusted longitudinally as well as radially with respect to the member 46, being held in desired adjusted position by the several thumb screws. At its outer edge the member 46 is provided with an arcuate degree scale 66. The inner and outer faces of member 46 are provided with grooves 68 and 70, respectively, and one side face is provided with a dovetail groove 72. A slide member 74 is mounted so as to slide in the grooves 68 and 70 and carries a clamping bolt 76 having a tapered head 78 located in the dovetail groove 72. A thumb nut 80 on the clamping bolt 76 enables the slide 74 to be fixed in any desired position lengthwise of the member 46.

The slide 74 carries a sharp scribing point 82 held by the clamping thumb screw 84 and the outer face of the slide 74 advantageously, although not necessarily, carries a vernier scale 86. As will be evident, the sharp point 82 may be used as a center engaging the surface of the plotting body, about which the body member is swung to produce circular arcs on the plotting body by the action of the pencil or scribing element 52.

Referring more particularly to Fig. 2, the following characteristics of the rule or compass just described are to be noted. The curvature of the member 46 is such that the center about which the arc of the scale 66 is struck coincides with the center of the plotting body when the rule is placed on the plotting surface in the manner shown in Fig. 2. This is of course readily accomplished by suitable adjustment of the position of the bearing foot 50 and the scribing point 82, both of these elements being mounted to move along radial lines. Regardless of whether or not a vernier scale 86 is employed, the slide 74 is provided with a zero mark for use with the scale 66, which mark is radially coincident with the axis of the scribing point 82 carried by the slide.

Referring now to Figs. 9 to 11 inclusive there is shown a great circle rule for use with the plotting body 10. This rule comprises an arcuately curved member indicated generally at 88 having a concave spherically curved surface 90, the radius of which is the same as that of the surface of the plotting body 10. A sharp edge 92 of the surface 90 coincides with the line of intersection between the surface 90 of the rule and a diametral plane passing through the center about which the radius of the surface 90 is struck. As shown in the figures, the rule is conveniently provided with an inclined scale surface 94 upon which there is provided a degree scale 96 conveniently marked in degrees in both directions from a zero mark at the center of the rule. Ordinarily a rule providing for a scale of 70° on either side of the center will be of sufficient length.

Figs. 12 and 13 show in plan and elevation, respectively, a protractor indicated generally at 98 and having a concave spherically curved undersurface 100 of the same radius as the surface of the plotting body 10. The protractor carries at its margin a degree scale 102, around the sharp outer edge of the protractor.

Figs. 14 and 15 show in plan and elevation, respectively, a plotting instrument indicated generally at 104, the undersurface 106 of which is spherically concave on the same radius as that of the surface of the plotting body. A sharp edge 108 of the instrument coincides with the line of intersection between surface 106 and a diametral plane passing through the center for the radius of the surface 106. A bevelled face 110 is provided with a degree scale 112.

Figs. 16 and 17 illustrate a shield conveniently usable with the plotting body 10. This shield, indicated generally at 114, is of transparent material and its undersurface is concavely spherical to the radius of the plotting body 10. One of the surfaces of the shield, preferably the inner surface, is conveniently marked by etching or otherwise with lines 116 corresponding to degrees of longitude and lines 118 corresponding to degree of latitude. The surface extent of the shield may vary. Ordinarily a shield of the dimensions approximately as shown, encompassing 45° of longitude and 70° of latitude from a diametral line representative of the equator, will be sufficient.

The material or materials of which the plotting body and the several instruments which have been described may vary widely. The following considerations should, however, be taken into account if the most accurate results are to be obtained. Rigidity of the meridian member 14 and the rule or compass 46 is essential for accurate work. The great circle rule 88 also should be rigid but it is to be noted that this instrument as well as other instruments to be applied to the surface of the plotting body when in use, obtain guidance from the surface with which they are in contact which tends to hold them in their true position. In other words, if they should be flexed slightly, contact with the surface of the plotting body will tend to restore them to their true shape. On the other hand, the elements 14 and 44 receive no such guidance. Lightness of the materials used is a matter of convenience; more important is the matter of coefficient of expansion. Preferably, materials having low coefficient of expansion are employed and in so far as is practically possible the choice of materials should be such as to provide the minimum in difference of coefficient of expansion between the several instruments used. It is to correct for errors due to difference of expansion and the like that the marking element 52 on the rule of compass 44 is adjustably mounted so that truly accurate distances may be measured by this instrument on the surface of the plotting body.

The instrumentalities which have been described are useful for a wide variety of navigational and other purposes aimed at locating the geographical position of an observer from celestial observation, and we will first describe a procedure for locating the geographical position of an observer by what may be termed the two star system.

As is well known to all acquainted with the art of navigation, there is a group of stars commonly known as the useful stars, the geographical or substellar positions of which have been carefully determined and tabulated in the nautical almanac. From the data thus available and without calculation, an observer is enabled by the use of our invention to readily fix his geographical position quickly and accurately by observing the altitudes of two appropriately chosen of the usable stars, coupled with the data available in his almanac. This may be accomplished in the following simple manner, reference being had more particularly to the diagram of Fig. 18. In this diagram, 10 represents the spherically curved plotting body upon which an equator line 11 is plotted. A point 15 on the equator line 11 is located to represent the intersection with the equator of the Greenwich meridian 13. These lines may, as previously noted, be permanently indicated on the surface of the plotting body with the degrees of longitude indicated on the equator line. From his almanac the observer obtains the Greenwich hour angle of the selected stars, which for convenience may be designated as stars A and B. This data gives the observer the longitudes of the substellar positions of the respective stars at the given time and by means of the pivoted longitude rule the lines of longitude of the substellar positions of the respective stars may be plotted on the plotting body. From the declinations given in the almanac the geographical positions of the two stars on their respective lines of longitude may then be set off by means of the arcuate rule, the slide on which is set to correspond with the respective declinations. For checking the accuracy of the arcuate rule it may be conveniently placed on the equator line of the plotting body, assuming the latter to have marked thereon an accurate longitude scale. Any inaccuracy shown by such a check may readily be compensated for by adjustment of the adjustably mounted marking instrument. With the proper declination set off on the arcuate rule and with the scribing point of the rule located at the intersection of the equator line and the proper line of longitude of the substellar position of the star to be used, an arc is struck so as to intersect that line of longitude to determine on the surface of the plotting body the geographical position of the star to be used. In the present example, let it be assumed that the line 17—17 represents the Hour Circle of star A at the time of observation, and that the line 19 represents the arc corresponding to the declination of the star. The geographical position of the star A on the surface of the plotting body is represented by point 21. Similarly, if line 23 is the meridian of the substellar position of the star B and line 25 corresponds to the declination of star B, the geographical position of the latter is determined by point 27 on the plotting surface. While in the interests of the greatest accuracy, the arcuate compass is advantageously employed for laying off distances corresponding to declinations, since this compass can readily be checked and adjusted from time to time for accuracy, the declinations also may be laid off by setting to proper position the slide member 34 on the pivoted longitude rule attached to the plotting body, this rule being conveniently provided on its longitude determining face with a suitable degree scale.

The geographical positions of the stars A and B having been determined for the time of observation, the altitudes of these stars are then observed and noted by the observer, such observations being made in as rapid succession as is consistent with accuracy. It is to be noted in this connection that variable altitude of the observer above the surface of the earth does not introduce any error, the reason for this being that because of the distance to the source of light observed, the light rays are approximately parallel. Consequently no element of error is introduced regardless of whether the observer be on the ground or in an aircraft in the stratosphere. From the observed altitude of star A the zenith distance of the observer from that star, which is equal to 90° minus the observed altitude, is laid off on the arcuate rule and with the scribing point set on the geographical position 19 of the star on the plotting surface, an arc 29 is struck by the marking point 52, this arc being the portion of the circle of position of the observer relative to the geographical position of the star. Similarly, the zenith distance of the observer from star B (90° minus the observed altitude) is set off on the arcuate rule and with point 27 as a center a second arc 31 is struck. The intersection of the two arcs at point 33 is the geographical position of the observer and the latitude and longitude of this position are readily obtainable by use of the pivoted longitude rule, assuming a longitude scale to be applied to the plotting body, and by means of the slide carried by the longitude rule and the longitude scale associated therewith. Alternatively, for reasons of accuracy previously noted, the longitudinal rule may be used merely to project the longitude line 35 of point 33 to the equator and the latitude of point 33 measured along line 35 by means of the arcuate rule with its vernier scale. Similarly, the same instrument may be used to determine the longitude by measurement from point 37 on the equator to the point 15 at the intersection of the equator with the Greenwich meridian. Also for quick determination of approximate longitude and latitude of point 33 or similar point the shield shown in Figs. 16 and 17 may be conveniently used, the shield being laid on the plotting body with the great circle or equator edge of the shield coincident with the equator line on the plotting body.

While it has been stated above that the intersection of the arcs 29 and 31 and point 33 is representative of the position of the observer it is to be noted that these arcs if extended will intersect at a second point 39 and an observer geographically located at point 39 and observing the same stars at the same time would observe the same altitudes. It is thus theoretically possible for the observer to be either at the point 33 or point 39, but for all practical purposes the observer will from extraneous factors know which one of the two theoretically possible positions he is actually occupying.

From the above, it will be clear that the result is obtained with substantially no calculation and also that the result is one which obviously can be arrived at in an exceedingly short time after observations are made. Also, the procedure is visually accomplished and is so simple that the chances for error are minimized. The accuracy with which positions may be determined is primarily dependent upon the accuracy with which the observations of the stars are taken and the precision of manufacture of the instruments used. We have determined, however, from actual experiment, that even with relatively very crude instruments, from which a degree of accuracy comparable to that obtainable with precision instruments could not be expected, a "fix" or determination of the observer's position is obtainable which is within a matter of a very few miles of the exact position obtained by careful and accurate computation from the best available data. As previously noted, we have found a scale of 3 millimeters per degree of arc to be advantageous since such a scale results in a plotting body not too large to be readily usable in relatively cramped quarters and the scale further is readily subdivided to provide for the measurement of minutes of arc. Thus by using a vernier having a relation to the main scale of the arcuate rule or compass of 20 divisions to 19, the vernier can be employed to an accuracy of one minute of arc. Obviously, if a larger scale is employed, as may be done where space is not at a premium, even greater accuracy is expectable.

In addition to the above noted advantages of simplicity and accuracy there are other very important advantages to be derived from the use of our invention, since for any particular intended use or group of uses, data on the plotting body may readily be prepared in advance. Thus prior to departure on a given intended flight, in the case of an aircraft, the geographical positions of a relatively large number of the usable stars that may advantageously be employed during the flight may be located on the plotting surface and in connection with the choice of such stars it is to be noted that in the interests of accuracy in the fixing of a position, the most advantageous stars to utilize are pairs of stars which at the time of observation have geographical positions which bear as closely as possible at 90° from each other with respect to the position of the observer. The reason for this will be apparent by inspection of Fig. 18, where the positions of the stars A and B bear at little more than a right angle from each other with respect to the observer's position. With stars thus relatively located with respect to the observer, the arcs of the circles of position will intersect at an angle approximating a right angle and thus will give a sharply defined point of intersection. This obviously would not be the case were the circles of position to intersect at an acute angle, having in mind the very small scale of the plotting body and a certain irreducible minimum width of the lines marking the circles of position.

Having beforehand a plotting body with the geographical positions of the usable stars plotted therein for times corresponding to times during the intended flight it is very readily possible for a navigator by visual inspection of the plotting surface to determine which of the stars may most advantageously be used at given times during the flight. For flights scheduled in advance, all of the data necessary for the use of given stars at given times can readily be worked out in advance by a dispatcher from a master plotting surface, who can then instruct the navigator what commencement of the flight as to exactly what stars to observe at given hours during his flight, and their coordinates, in order to check his actual position relative to his intended position at any time during the flight.

Since the stars are moving and since there must necessarily be some elapsed time between the time it is possible to observe the altitude of two different stars, there is introduced a theoretical margin of error, due to the fact that the geographical positions of the stars are plotted on the plotting surface for the same instant of time and there is a slight difference in the times of actual observations of the stars. This in general is handled by interpolation of times of observation to coincide with time-geographical positions of the stars.

On the other hand should we, as we now can do, select from our dispatcher's master plotting body two stars at proper altitude and at approximately 90° from each other with respect to the observer's position, of which one is transiting, that is, moving exceedingly slowly in change of Hour Angle and the other is rising, this error is so small as to be negligible, being within the limits of error made in observation of altitude because of the human equation. Even if due to some unforeseen circumstance there should be a time interval of serious proportions in taking the observations of two stars for determining this kind of fix, this would not be serious for the reason that due to the simplicity and rapidity with which fixes may be obtained by the present system, numerous observations at relatively short time intervals can readily be taken by a navigator in flight for the purpose of plotting his course from a multiplicity of points which will serve to mutually check and correct each other.

The method above described, being dependent upon the observation of two celestial bodies, is, except under exceptionally rare circumstances when both the sun and the moon or a planet are visible at the same time, usable only between sunset and sunrise or in other words during those hours when the stars and planets are visible.

Our invention is not, however, limited in its use to night observation, since it can be employed to provide navigation of highly valuable practical accuracy and utility by methods requiring observation of only one celestial body, such methods enabling observation of the sun to be employed, with consequent utility during daylight hours. One such additional method is fully described in our application Serial No. 453,608, of which this is a division.

It is evident that many variations in the specific design of the equipment employed and variations in the specific application of the methods hereinbefore described may be made without departing from the principles of the invention, the scope of which is to be understood as embracing all features falling within the scope of the appended claims.

What is claimed:

1. For use in celestial navigation, a plotting body having a spherically curved plotting surface the radius of which bears a predetermined scale relationship to the radius of the earth, and an independently manipulatable rule for selectively marking arcs of circles about centers located in any selected relation and position on said plotting surface, said rule comprising an arcuate body member bearing an arcuate scale and a slide member adjustable along the length of said body member, one of said members carrying a pointed element projecting inwardly on a radius of the arc of said scale adapted to engage said plotting surface at a selected place thereon to permit the rule to be swung around such place as a center and the other of said members carrying an inwardly projecting marking element for marking an arc on said plotting surface when the rule is swung, said elements being radially adjustable to contact the plotting surface when the arc of said scale is truly concentric with said plotting surface, at least one of said elements being adjustably carried by one of said members for adjustment in a direction lengthwise of said body member and said marking element being pivotally mounted to provide a lengthwise adjustment thereof.

2. An arcuate rule for use in celestial navigation with a plotting body having a spherically curved plotting surface the radius of which bears a predetermined scale relationship to the radius of the earth, said rule comprising an arcuate body member and a slide member, said members having cooperatively engaging slide surfaces for permitting the sliding member to move in an arcuate path along said body member and means clamping the slide member in a predetermined position, said body member having a supporting means comprising a radially adjustable blunt element located adjacent one end of the body member and adapted to slide on the plotting surface, the body member being provided with a scale for measuring the degrees of an arc, a radially adjustable pointed element being carried by the slide member for engaging the plotting surface, and a marking element being carried by the body member adjacent the other end thereof for marking an arc on the plotting surface with the pointed element providing a center about which the arc is marked, the position of the body member being adjusted by the supporting means and the pointed element so that the arc thereof will be truly concentric with the plotting surface at all times.

3. A device as set forth in claim 2 in which said marking element is pivotally mounted about an axis normal to the plane of said scale to permit the adjustment thereof to a position such that the point of the marking element lies exactly on a radius struck from a predetermined position on said arcuate scale to the center about which the arc of the scale is struck.

4. An arcuate rule for use in celestial navigation with a plotting body having a spherically curved plotting surface the radius of which bears a predetermined scale relationship to the radius of the earth, said rule having an arcuate body member, a radially adjustable blunt supporting element extending radially inwardly from said body member adjacent to one end thereof and a radially adjustable marking element extending radially inwardly from said body member adjacent to the other end thereof, means for adjusting said marking element lengthwise of said body member, a slide member adjustable along the length of said body member and a second supporting element carried by said slide member and projecting radially inwardly therefrom, said second supporting member having a pointed end adapted to engage said plotting surface at any selected place thereon to permit the rule to be swung around such place as the center.

DRURY A. McMILLEN.
ANTON STUXBERG.

REFERENCES CITED

The following references are of record in the file of this patent:

UNITED STATES PATENTS

| Number | Name | Date |
|---|---|---|
| 168,514 | McVicar | Oct. 5, 1875 |
| 295,076 | Svenson | Mar. 11, 1884 |
| 371,160 | Wylie et al. | Oct. 4, 1887 |
| 379,914 | Story | Mar. 20, 1888 |
| 387,957 | Moreon et al. | Aug. 14, 1888 |
| 774,998 | Willson | Nov. 15, 1904 |
| 844,536 | Prindle | Feb. 19, 1907 |
| 1,016,176 | Roca | Jan. 30, 1912 |
| 1,175,612 | Cresse | Mar. 14, 1916 |
| 1,282,020 | Anderson | Oct. 22, 1918 |
| 1,351,941 | Challet | Sept. 7, 1920 |
| 1,352,320 | Souders | Sept. 7, 1920 |
| 1,392,825 | Gonzales | Oct. 4, 1921 |
| 1,619,750 | Nelson | Mar. 1, 1927 |
| 1,826,081 | Magers | Oct. 6, 1931 |
| 1,849,202 | Pfuger | Mar. 15, 1932 |
| 2,420,608 | Menge | May 13, 1947 |

FOREIGN PATENTS

| Number | Country | Date |
|---|---|---|
| 133 of 1860 | Great Britain | Jan. 18, 1860 |
| 2,457 of 1882 | Great Britain | May 24, 1882 |
| 125,526 | Germany | Sept. 20, 1901 |
| 130,930 | Great Britain | Aug. 14, 1919 |
| 149,293 | Germany | May 10, 1903 |